United States Patent [19]
Oishi et al.

[11] Patent Number: 5,951,404
[45] Date of Patent: Sep. 14, 1999

[54] RIDING GAME MACHINE

[75] Inventors: Toshimitsu Oishi; Hirofumi Nagao, both of Kobe, Japan

[73] Assignee: Konami Co., Ltd., Hyogo-ken, Japan

[21] Appl. No.: 08/775,119

[22] Filed: Dec. 30, 1996

[30] Foreign Application Priority Data

Feb. 20, 1996 [JP] Japan .................................. 8-031527

[51] Int. Cl.$^6$ .................................................. A63G 31/06
[52] U.S. Cl. ................................ 472/60; 463/36; 434/55
[58] Field of Search .................................. 472/59, 60, 61, 472/130, 135; 463/7, 36, 37; 434/37, 55, 60, 61, 62

[56] References Cited

U.S. PATENT DOCUMENTS

| | | | |
|---|---|---|---|
| 4,630,817 | 12/1986 | Buckley | 472/61 X |
| 4,817,950 | 4/1989 | Goo | 463/37 |
| 5,195,746 | 3/1993 | Boyd et al. | 463/37 |
| 5,618,995 | 4/1997 | Otto et al. | 434/62 X |
| 5,713,794 | 2/1998 | Shimojima et al. | 463/36 |
| 5,823,876 | 10/1998 | Unbehand | 463/37 |
| 5,865,624 | 2/1999 | Hayashigawa | 434/66 |

FOREIGN PATENT DOCUMENTS

| | | |
|---|---|---|
| 4352982 | 12/1992 | Japan . |
| 5103875 | 4/1993 | Japan . |
| 674193 | 10/1994 | Japan . |

*Primary Examiner*—Kien T. Nguyen
*Attorney, Agent, or Firm*—Jordan and Hamburg LLP

[57] ABSTRACT

A riding game machine for playing the game of a jet ski race, for example has a display unit for displaying a simulated image of an object on a wavy surface, and a riding device swingable depending on the simulated image displayed by the display unit. The riding device has a riding unit for a player to ride thereon, a handle coupled to the riding unit for changing a direction of travel of the object of the simulated image displayed by the display unit, an accelerator lever mounted on the handle for changing a speed of the object of the simulated image displayed by the display unit, a pitching member for swinging the riding unit about a horizontal transverse axis, a rolling member for swinging the riding unit about a horizontal longitudinal axis, and a pitching mechanism for actuating the pitching member in relation to travel of the object on the wavy surface in the simulated image displayed by the display unit.

10 Claims, 9 Drawing Sheets

RIDING GAME MACHINE

BACKGROUND OF THE INVENTION

1. Field of the Invention

The present invention relates to a riding game machine having a display unit for displaying simulated images and a riding device on which the player of the riding game machine is seated for operating the riding game machine.

2. Description of the Prior Art

There have heretofore been known riding game machines which have a seat, resembling the driver's seat of a motor vehicle such as an automobile or the like, for the player to be seated for playing an automobile race game or the like while viewing simulated images displayed on a display unit. In such a known riding game machine, the seat remains still while the player is playing the game and viewing the simulated image on the display unit. Since the seat does not move, however, the player sitting on the seat feels unreal during the game.

Various efforts have recently been made in the art to develop riding game machines to meet demands for more diverse and complex game functions. One riding game machine thus developed has a riding device on which the player rides and which swings when a simulated image displayed on a display unit changes as the game proceeds. For example, the riding device swings such that the player riding thereon feels realistically as if moving on rough surfaces in combination with visual sensations obtained from the simulated image displayed on the display unit, just like riding on a jet ski speeding on wavy sea surfaces. The riding game machine, however, is complex in structure, large in size, and highly expensive to manufacture because it requires many mechanisms for swinging the riding device, such as an X-Y table unit, cylinder units, turning units, etc.

SUMMARY OF THE INVENTION

It is therefore an object of the present invention to provide a riding game machine which is of a relatively simple structure capable of swinging a riding device in relation to a simulated image of wavy surfaces to allow the player to feel realistic during the game played on the riding game machine.

To achieve the above object, there is provided a riding game machine a riding game machine comprising a display unit for displaying a simulated image of an object on a wavy surface, and a riding device swingable depending on the simulated image displayed by the display unit, the riding device comprising a riding unit for a player to ride thereon, a handle coupled to the riding unit for changing a direction of travel of the object of the simulated image displayed by the display unit, an accelerator lever mounted on the handle for changing a speed of the object of the simulated image displayed by the display unit, swinging means for swinging the riding unit, the swinging means having a pitching member for swinging the riding unit about a horizontal transverse axis and a rolling member for swinging the riding unit about a horizontal longitudinal axis, and pitching means for actuating the pitching member in relation to travel of the object on the wavy surface in the simulated image displayed by the display unit.

The riding game machine is of a relatively simple structure, and can swing the riding device depending on the wavy surface displayed on the display unit to make the player feel realistic in a game played on the riding game machine.

The pitching means comprises a vertical drive shaft, actuating means for rotating the vertical drive shaft about its own axis, and a movable member threaded over the vertical drive shaft for movement along the vertical drive shaft in response to rotation of the vertical drive shaft by the actuating means, the movable member being coupled to the pitching member. This arrangement allows the riding device to swing depending on the wavy surface in the simulated image displayed by the display unit.

The pitching member comprises a pitching frame having a front end coupled to the movable member and movable about the horizontal lateral axis in response to movement of the movable member along the vertical drive shaft, and wherein the rolling member comprises a rolling plate, the pitching frame having an inner space defined therein, the rolling plate being disposed in alignment with the inner space and angularly movable about a shaft mounted on the pitching frame in alignment with the horizontal longitudinal axis. This structure also permits the riding device to swing depending on the wavy surface in the simulated image displayed by the display unit, making the player feel realistic in the game played on the riding game machine.

The swinging means further comprises a yawing member for swinging the riding unit about a vertical axis. The yawing member comprises a yawing plate disposed on the rolling plate and having a front portion angularly movable about a shaft disposed on a rear portion thereof in alignment with the vertical axis. This structure allows the riding device to swing in more complex movements depending on the wavy surface in the simulated image displayed by the display unit, making the player feel realistic in the game played on the riding game machine.

According to the present invention, there is also provided a riding game machine comprising a riding unit for a player to ride thereon, the riding unit being swingable about at least a horizontal lateral axis and a horizontal longitudinal axis thereof, a pitching member coupled to the riding unit for swinging the riding unit about the horizontal transverse axis, a rolling member coupled to the riding unit for allowing the riding unit to swing about the horizontal longitudinal axis depending on movement of the player on the riding unit, a display unit for displaying a simulated image of an object on a wavy surface, a handle coupled to the riding unit and operable by the player for changing a direction of travel of the object of the simulated image displayed by the display unit, an accelerator lever mounted on the handle and operable by the player for changing a speed of the object of the simulated image displayed by the display unit, pitching means for actuating the pitching member, and control means for controlling the pitching means depending on the direction and speed of the object on the wavy surface in the simulated image displayed by the display unit.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
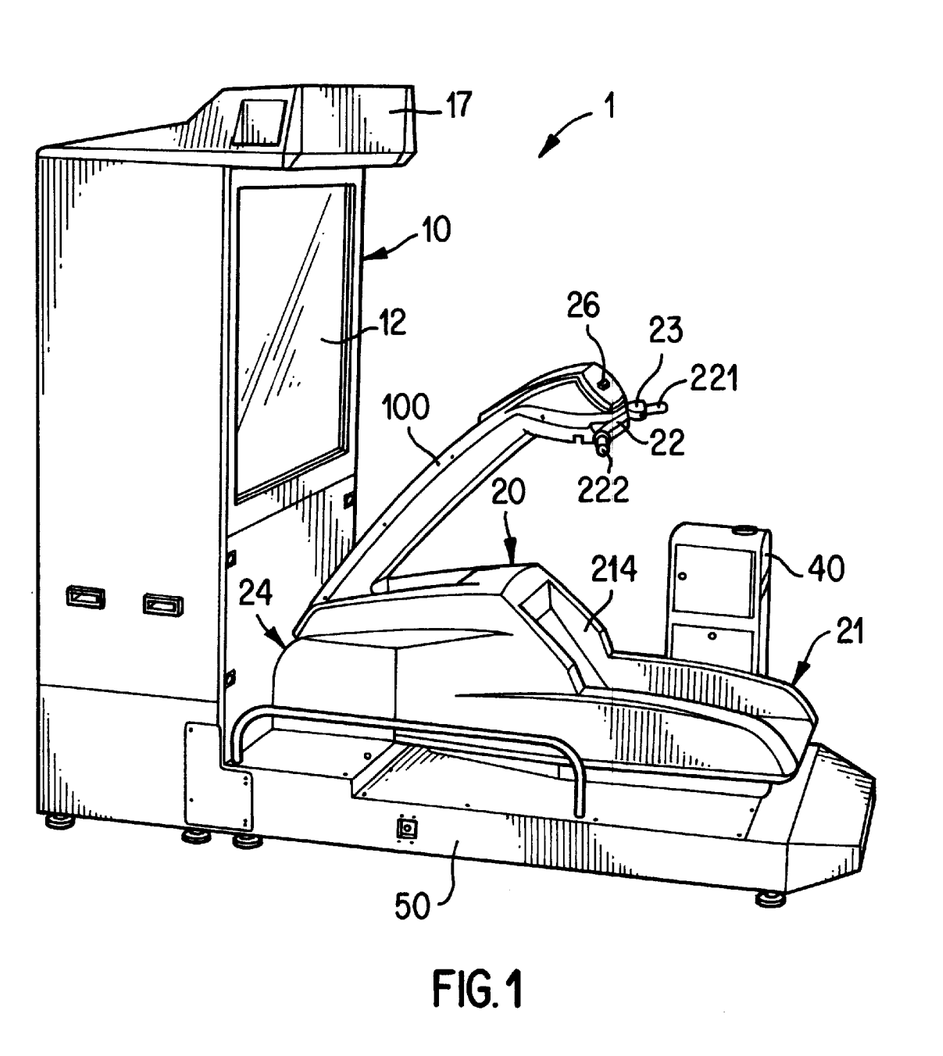
FIG. 1 is a perspective view of a riding game machine according to the present invention.
Figure 2:
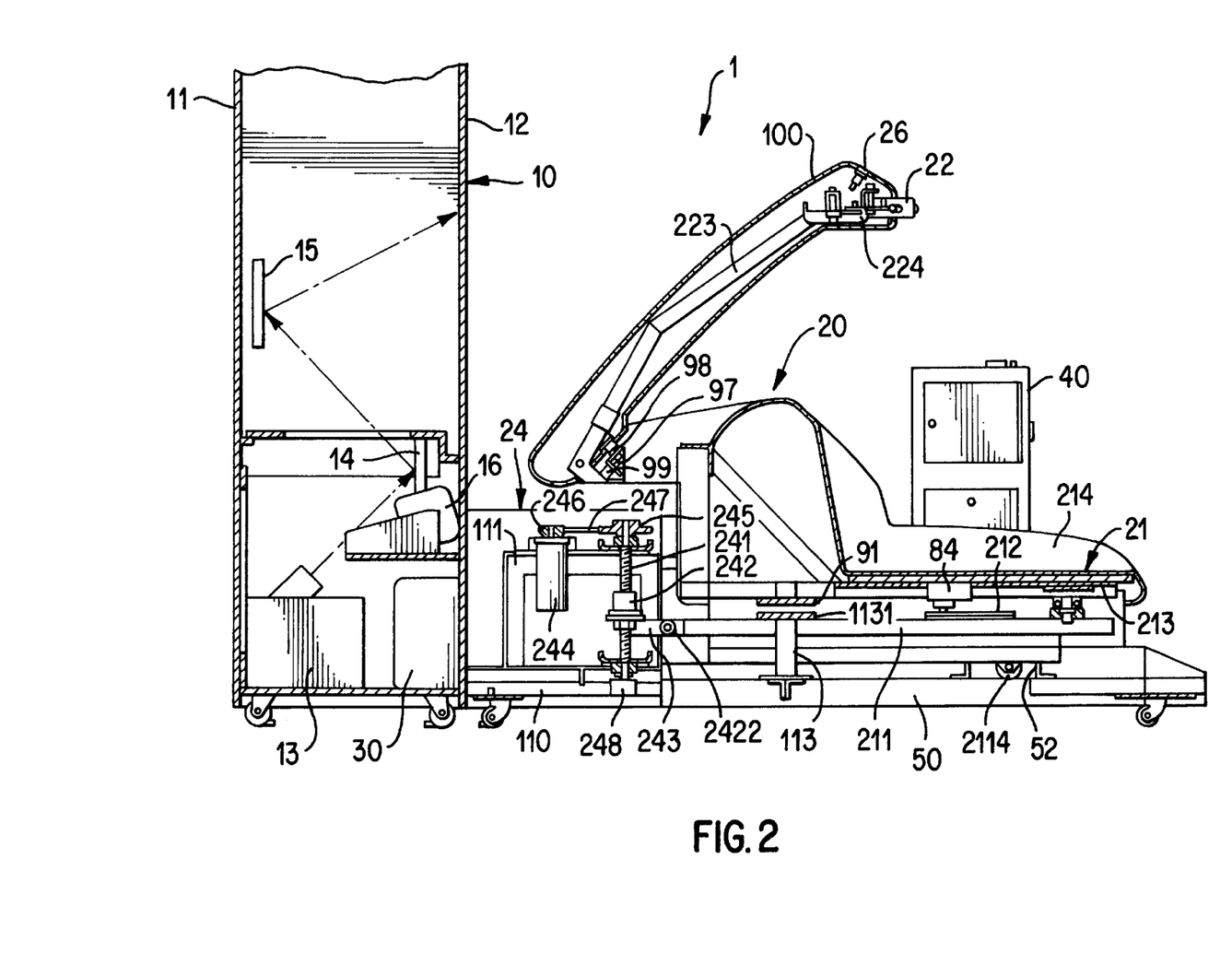
FIG. 2 is a fragmentary vertical cross-sectional view of the riding game machine shown in FIG. 1.

As shown in FIGS. 1 and 2, a riding game machine 1 according to the present invention operates to simulate a jet ski, for example, as being operated by the player of the riding game machine 1. The riding game machine 1 generally comprises a display unit 10 for displaying simulated images, a riding device 20 which is swingable in various directions in relation to the simulated images displayed on the display unit 10, a controller 30 for controlling the display unit 10 and the riding device 20, and a coin receiver 40 for starting a game when it receives a coin. The riding device 20 has an appearance which resembles a jet ski, and can be operated by the player to simulate a jet ski on the display unit 10.

The display unit 10 comprises a housing 11, a screen 12 extending from a central portion to an upper portion of the housing 11, a video projector 13 disposed in a lower portion of the housing 11, and reflecting plates 14, 15 disposed in the housing 11 above the video projector 13 for projecting simulated images of a jet ski operated by the player, sea waves, obstacles such as a coast line, which are projected by the video projector 13, onto the screen 12. The lower portion of the housing 11 also accommodates a loudspeaker 16 for outputting various effect sounds including engine sounds, wave sounds, background music, etc. as a game proceeds. A display panel 17 for displaying the name of a simulating game is mounted on the upper end of the housing 11. The controller 30 is placed in the housing 13 near the video projector 13.

The riding device 20 comprises a riding unit 21 on which the player stands, a horizontal bar handle 22 for changing directions of the jet ski displayed on the screen 12, an accelerator unit 23 mounted on a right-hand side of the bar handle 22 for changing speeds of travel of the jet ski displayed on the screen 12, and a pitching mechanism (pitching means) 24 for vertically swinging the riding unit 21 as a simulating game proceeds.

The riding unit 21 comprises a pitching frame 211 disposed on a base frame 50 and serving as a pitching member for swinging the riding unit 21 about a horizontal transverse axis, a rolling plate 212 disposed in the pitching frame 211 and serving as a rolling member for swinging the riding unit 21 about a horizontal longitudinal axis, a yawing plate 213 disposed on the rolling plate 212 and serving as a yawing member for swinging the riding unit 21 about a vertical axis, and a hooded floor base 214 mounted on the yawing plate 213 and resembling a wave protector on a jet ski. The pitching member, the rolling member, and the yawing member jointly make up a swinging means for swinging the riding unit 21.

Figure 3:
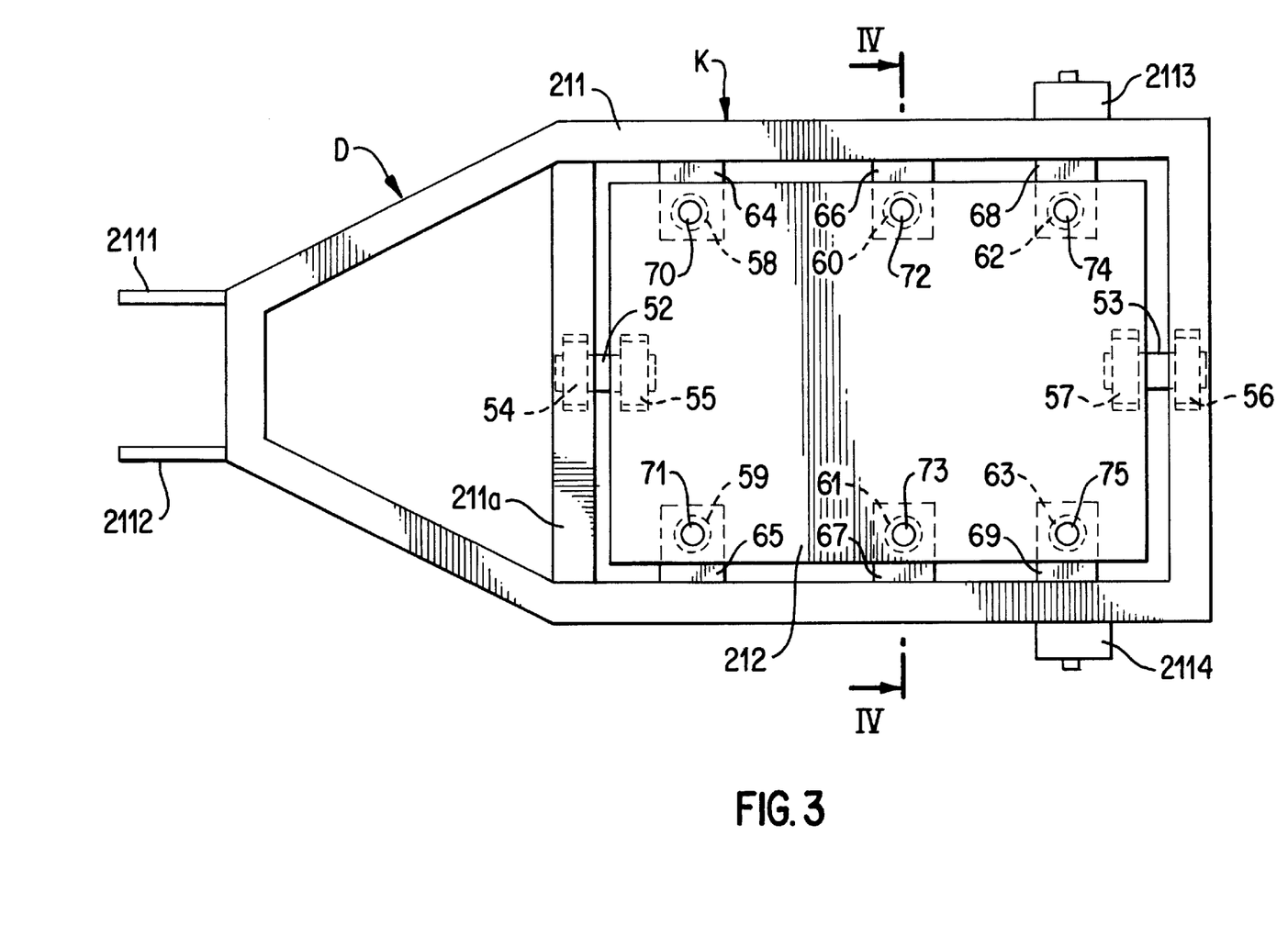
FIG. 3 is a plan view of a pitching frame and a rolling plate of the riding game machine shown in FIG. 1.

As shown in FIG. 3, the pitching frame 211 is of a longitudinally elongate, horizontally planar, open structure including a front trapezoidal member D and a rear rectangular member K which are integrally joined to each other by an intermediate transverse beam 211a. The front trapezoidal member D has on its front end a pair of joint arms 2111, 2112 connected to the pitching mechanism 24. Two wheels 2113, 2114 are mounted on respective opposite sides of a rear portion of the rear rectangular member K and held in rolling contact with the base frame 50 for rolling movement in the longitudinal directions of the riding unit 21 (see also FIG. 4). As shown in FIG. 2, stops 52 are mounted on the base frame 50 for limiting rolling movement of the wheels 2113, 2114 to a certain range on the base frame 50.

Figure 4:
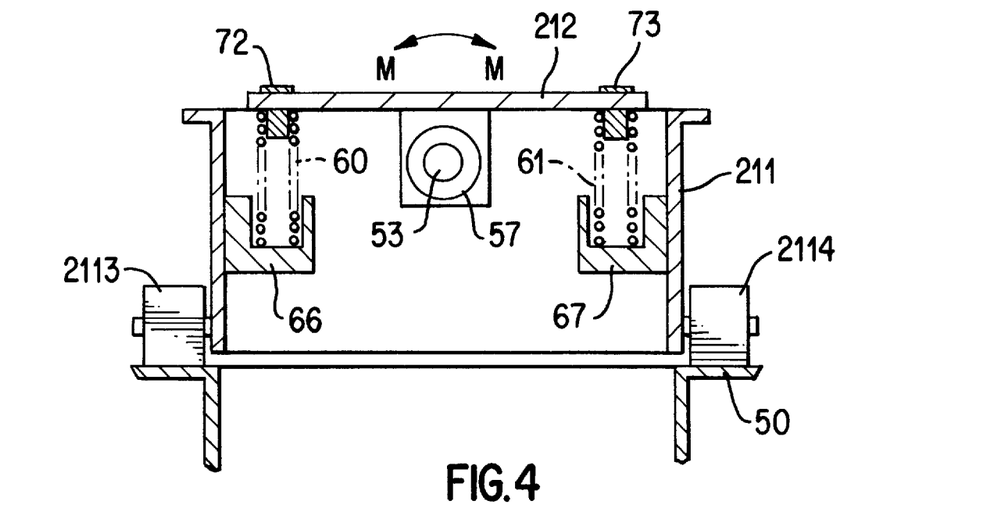
FIG. 4 is a cross-setional view taken along line IV—IV of FIG. 3.

As shown in FIGS. 3 and 4, the rolling plate 212 is positioned in an inner space of the rear rectangular member K, and angularly movably mounted on two shafts 52, 53 that are positioned on a longitudinal axis of the pitching frame 211 at respective front and rear ends of the rear rectangular member K. Specifically, the shaft 52 has its opposite ends fitted in a bearing 54 mounted on a front lower surface of the rear rectangular member K and a bearing 55 mounted on a front lower surface of the rolling plate 212. The shaft 53 has its opposite ends fitted in a bearing 56 mounted on a rear lower surface of the rear rectangular member K and a bearing 57 mounted on a rear lower surface of the rolling plate 212. The rolling plate 212 is thus angularly movable about an axis which interconnects the shafts 52, 53, laterally in the directions indicated by the arrows M, M with respect to the pitching frame 211.

Six helical springs 58~63 are vertically disposed beneath opposite sides of the rolling plate 212, i.e., the helical springs 58, 60, 62 beneath one side and the helical springs 59, 61, 63 beneath the other side, for limiting the rolling movement of the rolling plate 212 to a certain angle, e.g., of 5° on either side and hence a total of 10° on both sides. These helical springs 58~63 exert resilient forces to make the rolling movement of the rolling plate 212 smooth. The helical springs 58~63 have respective lower ends supported on respective spring rests 64~69 projecting inwardly from the opposite sides of the rear rectangular member K and respective upper ends fitted over and positioned by respective pins 70~75 projecting vertically through and fixed to the opposite sides of the rolling plate 212. The rolling plate 212, the shafts 52, 53, and the helical springs 58~63 jointly make up a rolling means for rolling the riding unit 21.

The rolling plate 212 may be disposed in the inner space directly surrounded by the pitching frame 211 or in a space above the inner space surrounded by the pitching frame 211 insofar as the rolling plate 212 is positioned in vertical alignment with the inner space surrounded by the pitching frame 211. The helical springs 58~63 may be replaced with other cushioning resilient bodies of rubber or the like.

Figure 5:
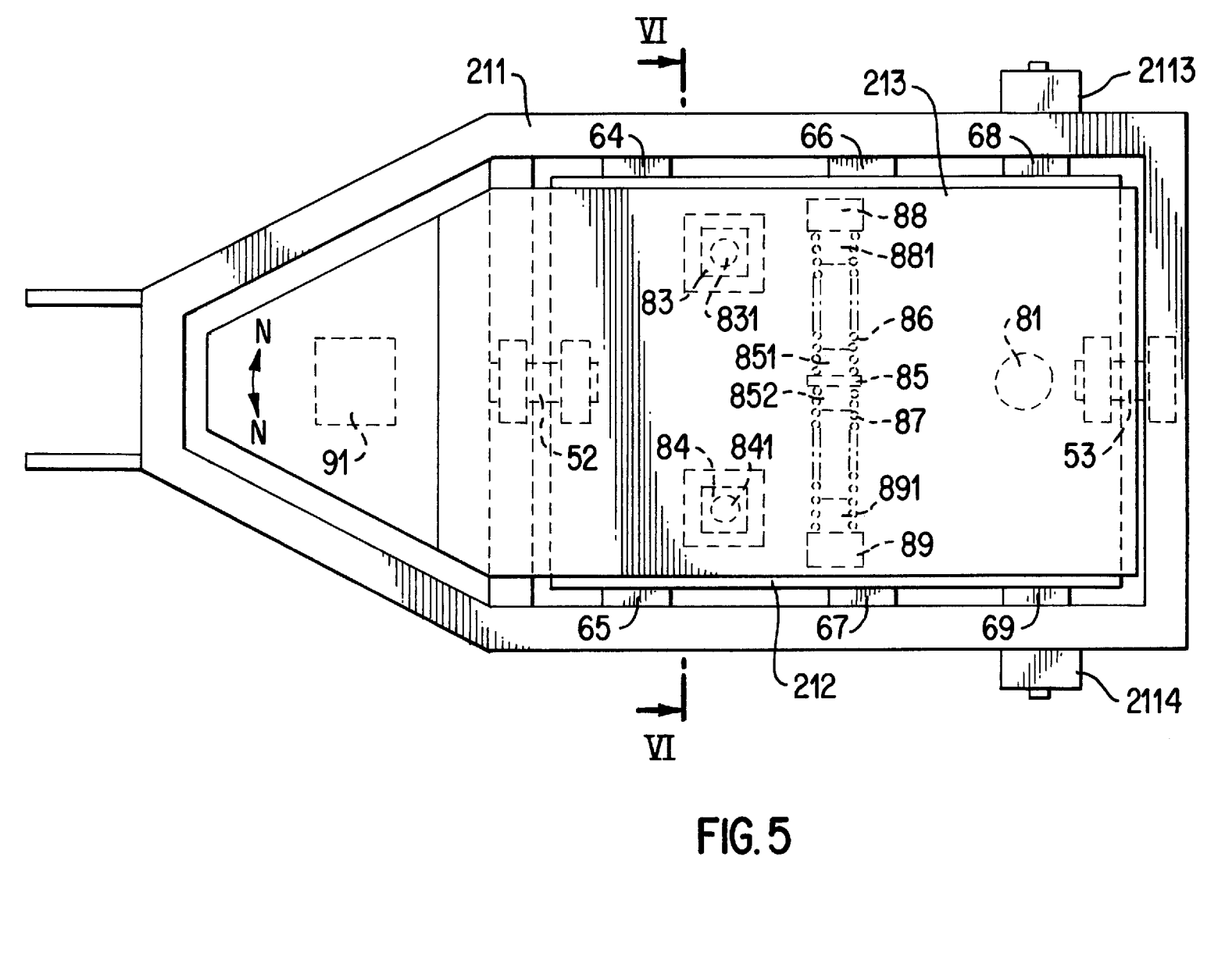
FIG. 5 is a plan view of a yawing plate of the riding game machine shown in FIG. 1.
Figure 6:
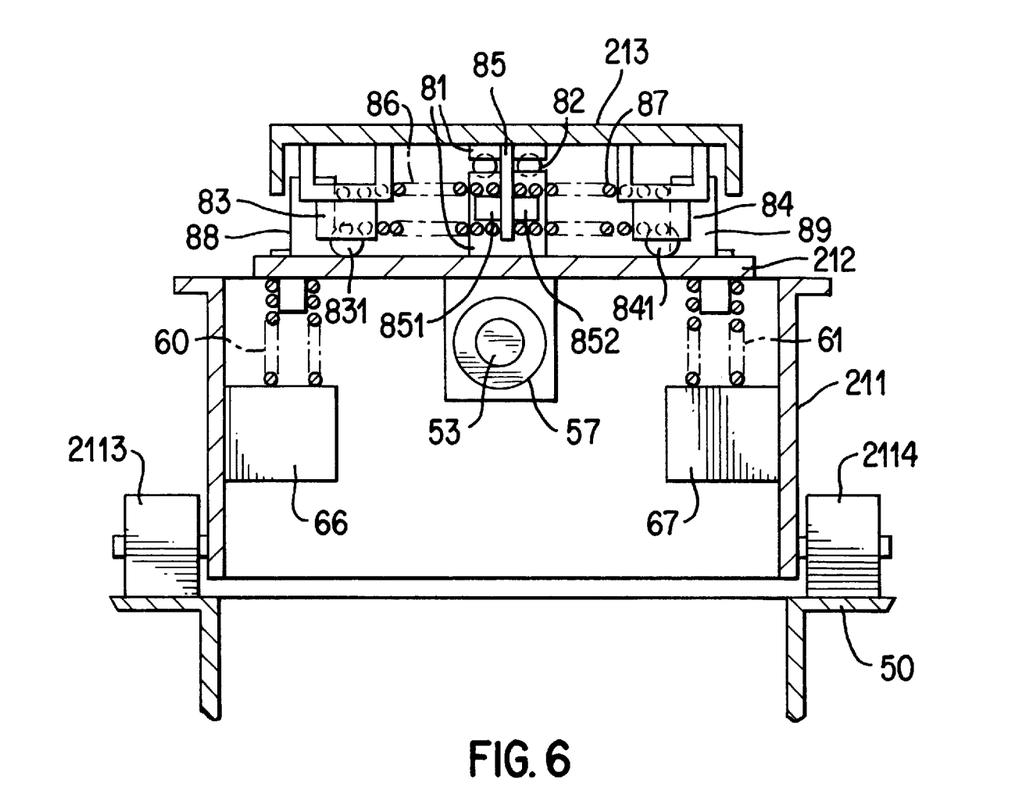
FIG. 6 is a cross-sectional view taken along line VI—VI of FIG. 5.

As shown in FIGS. 5 and 6, the yawing plate 213 is of a horizontal shape similar to the inner space surrounded by the pitching frame 211. The yawing plate 213, which is mounted on the rolling plate 212, has a front potion which is angularly movable about a shaft 81 on a rear central portion thereof laterally in the directions indicated by the arrows N, N (see FIG. 5) over the rolling plate 212. Specifically, the shaft 81 is divided into upper and lower portions with a ball bearing 82 disposed therebetween, with the upper portion attached the lower surface of a rear central portion of the yawing plate 213 and the lower portion to the lower surface of a rear central portion of the rolling plate 212. Ball casters 83, 84 are mounted on the respective lower surfaces of lateral opposite sides of a longitudinally intermediate potion of the yawing plate 213. The ball casters 83, 84 have respective balls 831, 841 held in rolling contact with the upper surface of the rolling plate 212 for allowing the yawing plate 213 to angularly move smoothly about the shaft 81. The ball casters 83, 84 may be replaced with other rolling elements such as hammer casters or the like.

A vertical plate 85 projects downwardly from the lower surface of the longitudinally intermediate potion of the yawing plate 213, and has pins 851, 852 mounted on a lower portion thereof and projecting laterally away from each other. The vertical plate 85 is positioned between and engaged by a pair of helical springs 86, 87 extending horizontally laterally over the upper surface of an intermediate portion of the rolling plate 212, for limiting the yawing movement of the yawing plate 213 to a certain angle, e.g., of 5° on either side and hence a total of 10° on both sides. These helical springs 86, 87 exert resilient forces to make the yawing movement of the yawing plate 213 smooth. The helical springs 86, 87 have respective inner ends fitted over and supported by the pins 851, 852 and respective outer ends fitted over and positioned by respective pins 881, 891 projecting inwardly from respective upwardly projecting blocks 88, 89 on respective opposite sides of the intermediate portion of the rolling plate 212. The helical springs 86, 87 may be replaced with other cushioning resilient bodies of rubber or the like.

The yawing plate 213, the shaft 81, the ball casters 83, 84, and the helical springs 86, 87 jointly make up a yawing means for yawing the riding unit 21. As described above, the hooded floor base 214 is mounted on the yawing plate 213. A rubber sheet 91 having a predetermined thickness is attached to the lower surface of the front portion of the yawing plate 213. When the riding game machine 1 is not operating, the rubber sheet 91 is held against a floor arrester 113 (see FIG. 2), to be described later on, for holding the riding unit 21 against accidental movement.

The bar handle 22 comprises a pipe and has grips 221, 222 (see FIG. 1) on its lateral opposite ends. The bar handle 22 is horizontally angularly movably attached to a control mechanism 224 mounted on upper ends of a pair of parallel arms 223 extending obliquely upwardly from a front end of the riding device 20 toward a rear end thereof.

Figure 7:
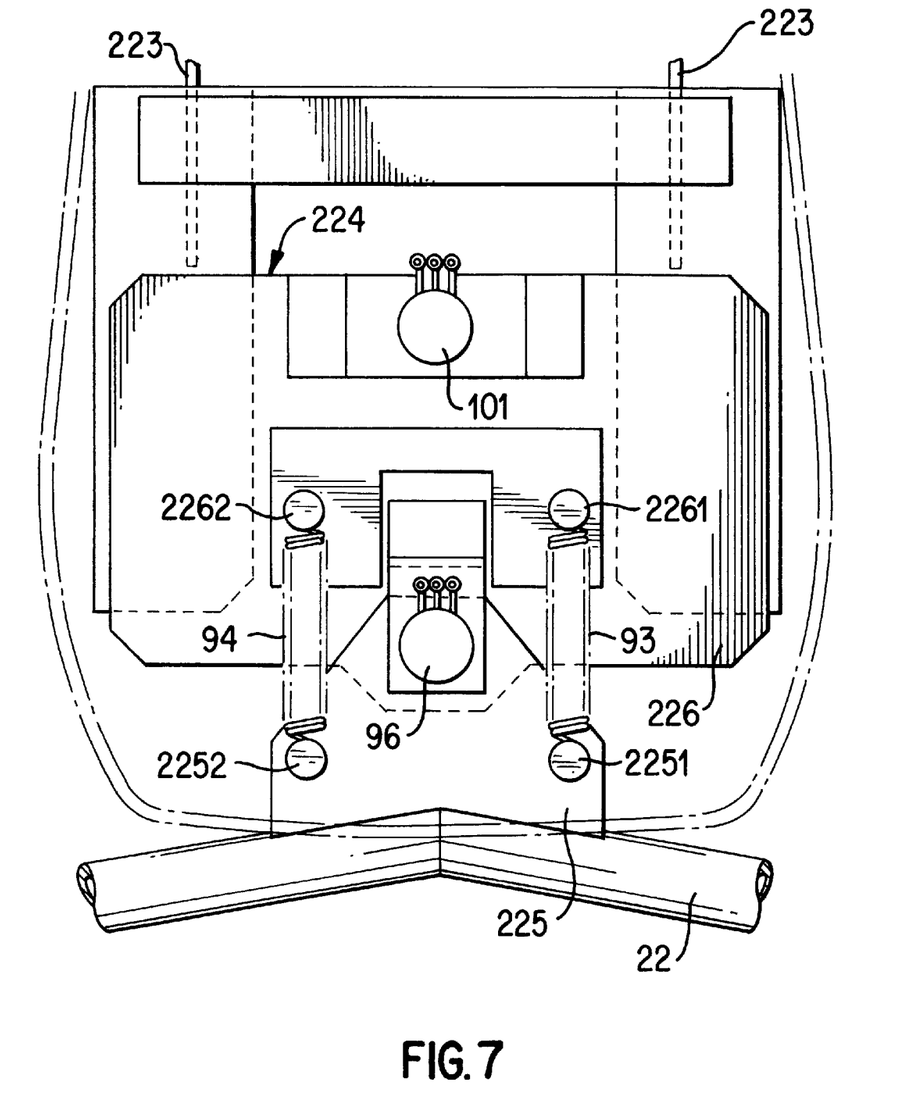
FIG. 7 is a fragmentary plan view of a control mechanism of a handle of the riding game machine shown in FIG. 1.
Figure 8:
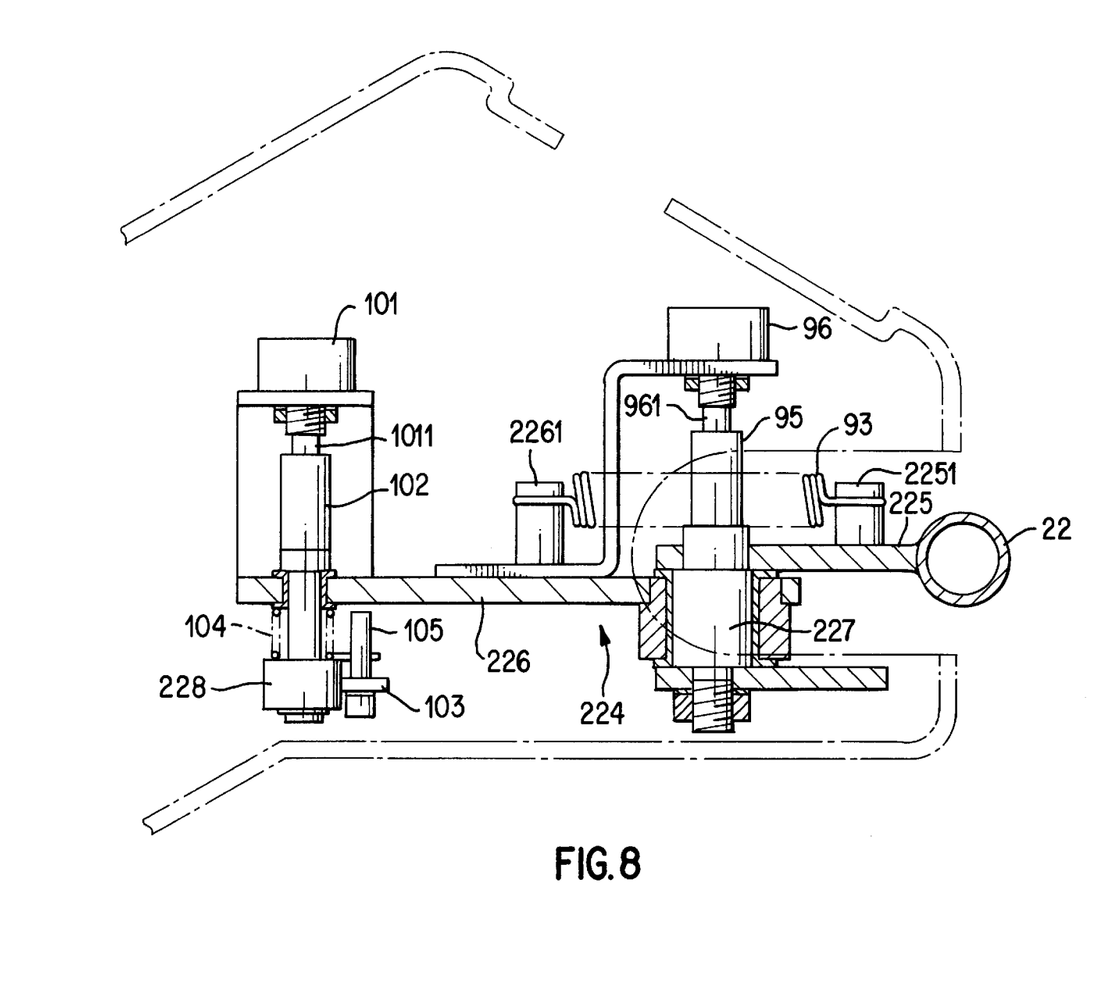
FIG. 8 is a vertical cross-sectional view of the control mechanism shown in FIG. 7.

The bar handle 22 is coupled to the control mechanism 224 as shown in FIGS. 7 and 8. A swing plate 225 integrally extends horizontally forward from a central portion of the bar handle 22 and is connected to a shaft 227 rotatably supported by a fixed plate 226 of the control mechanism 224.

Two helical springs 93, 94 have ends coupled to respective pins 2251, 2252 mounted on opposite sides of the swing plate 225 and other ends coupled to respective pins 2261, 2262 mounted on the fixed plate 226. The helical springs 93, 94 apply resilient forces to permit the bar handle 22 to angularly move smoothly about the axis of the shaft 227. In addition, the bar handle 22 is normally biased to return to its central position under the bias of the helical springs 93, 94 when it is released of forces applied to turn the bar handle 22 by the player. The bar handle 22 is angularly movable within a certain angular range by stops (not shown).

A potentiometer 96 has a rotatable shaft 961 coupled coaxially to the shaft 227 by a coupling 95. When the bar handle 22 is angularly moved by the player, the rotatable shaft 961 is rotated, causing the potentiometer 96 to output a voltage having a level depending on the direction in which and the angle through which the bar handle 22 is angularly moved. The voltage outputted by the potentiometer 96 is supplied to the controller 30. Depending on the level of the supplied voltage, the controller 30 detects a change to be made in the direction of travel of the jet ski displayed on the display unit 10 as being stimulated by the riding device 20, with respect to the central orientation of the jet ski.

The arms 223 have respective lower ends connected through resilient members 98, 99 of rubber and springs to respective arms of respective L-shaped members 97 attached integrally to the hooded floor base 214, so that the arms 223 and the hooded floor base 214 are essentially integrally united with each other. The resilient members 98, 99 allow the bar handle 22 to move elastically to a certain extent in the longitudinal directions of the riding device 20 with respect to the hooded floor base 214. The arms 223 are covered in their entirety with a cover 100 of synthetic resin or the like. A start switch 26 for starting a game on the riding game machine 10 is mounted on an upper end of the cover 100 in upwardly confronting relationship to the control mechanism 224. The start switch 26 is electrically connected to the controller 30.

Figure 9:
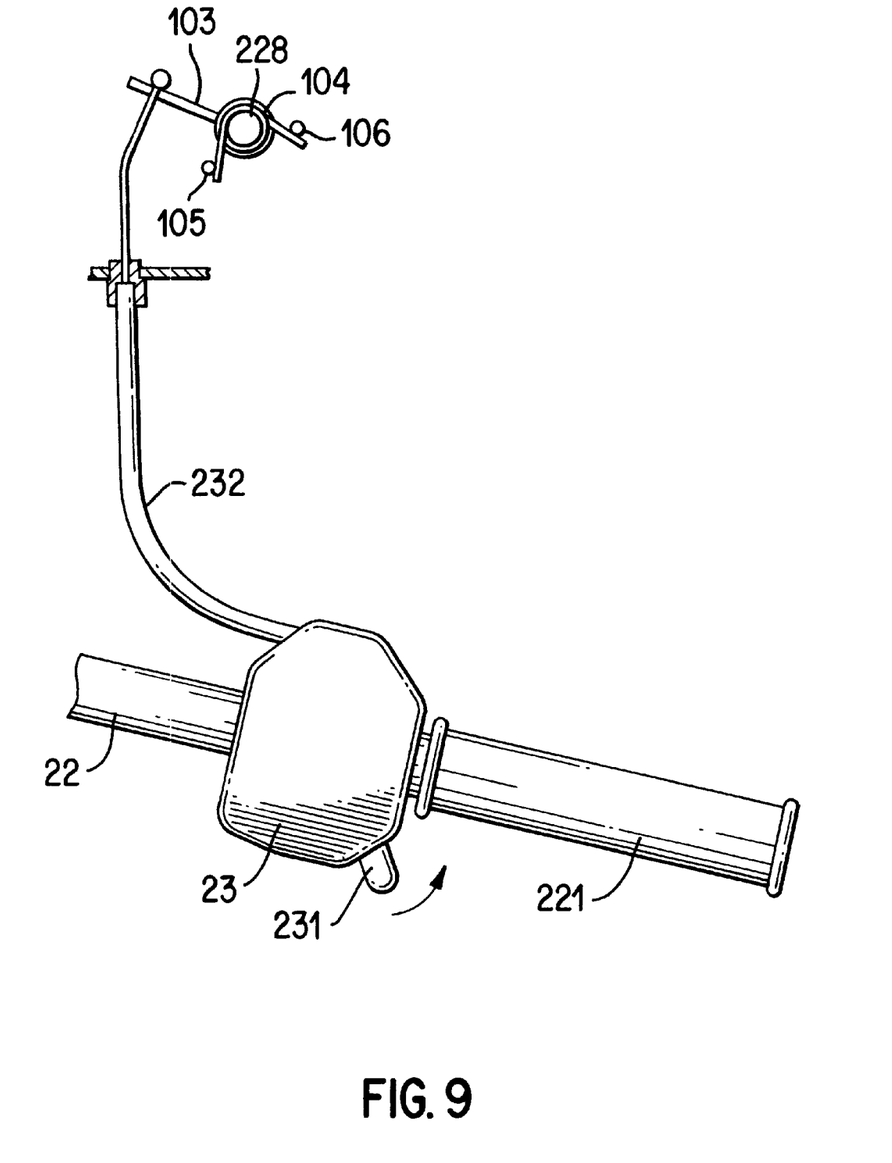
FIG. 9 is a fragmentary plan view of an accelerator mechanism of the riding game machine shown in FIG. 1.

As shown in FIG. 9, the accelerator unit 23 is attached to the bar handle 22 immediately inward of the right-hand grip 221 thereof. The accelerator unit 23 comprises upper and lower casing members which are joined to each other and fitted over the bar handle 22. An accelerator lever 231 which is angularly movable in a horizontal plane is pivotally supported in the accelerator unit 23 for angular movement about an axis within the accelerator unit 23. To the accelerator lever 231, there is connected an accelerator wire 232 which can be pulled toward the accelerator unit 23 when the accelerator lever 231 is pressed by a finger to turn in the direction indicated by the arrow in FIG. 9. When the accelerator wire 232 is pulled, it rotates a rotatable shaft 1011 (see FIG. 8) of a potentiometer 101 attached to the control mechanism 224.

Specifically, as shown in FIG. 8, the rotatable shaft 1011 of the potentiometer 101 is coupled by a coupling 102 to a shaft 228 which is angularly movably supported on the fixed plate 226. The accelerator wire 232 has an end joined to a lever 103 (see also FIG. 9) which is integrally joined to the shaft 228. When the accelerator wire 232 is pulled, the lever 103 and hence the shaft 228 are angularly moved, turning the rotatable shaft 1011 of the potentiometer 101. Upon the turning movement of the rotatable shaft 1011, the potentiometer 101 outputs a voltage whose level depends on the angle through which the accelerator lever 231 has been angularly moved. The voltage outputted by the potentiometer 101 is applied to the controller 30. Depending on the level of the supplied voltage, the controller 30 changes the speed of travel of the jet ski displayed on the display unit 10.

A helical spring 104 is disposed around the shaft 228 and has opposite ends engaged by respective pins 105, 106 for normally biasing the lever 103 to turn in a direction to pull the accelerator wire 232 from the accelerator unit 23. When the accelerator lever 231 is released from a finger push, the shaft 228 returns to its original angular position under the bias of the helical spring 104, forcing the lever 103, the accelerator wire 232, and the lever 231 to return to their original positions.

As shown in FIG. 2, the pitching mechanism 24 is disposed in front of the riding unit 21 and serves to swing the riding unit 21 vertically. The pitching mechanism 24 comprises a vertical screw shaft (drive shaft) 241, a collar (movable member) 242 threaded over the screw shaft 241, a stepping motor (actuating means) 244, and a drive force transmitting means for transmitting drive forces from the stepping motor 244 to the screw shaft 241. The screw shaft 241 extends between and is rotatably supported by a base 110 integral with the base frame 50 of the riding unit 21 and a frame 111 mounted on the base 110. The stepping motor 244 is mounted on the frame 111 with its drive shaft projecting upwardly.

The drive force transmitting means comprises a pulley 245 mounted on an upper end of the screw shaft 241, a pulley 246 mounted on the drive shaft of the stepping motor 244, and an endless belt 247 trained around the pulleys 245, 246. The drive forces from the stepping motor 244 are therefore transmitted through the pulley 246, the endless belt 247, and the pulley 245 to the screw shaft 241. Two vertically movable arms 243 are engaged by the collar 242 and extend parallel to each other rearward from opposite sides of the screw shaft 241. When the screw shaft 241 is rotated about its own axis by the stepping motor 244, the collar 242 vertically moves on and along the screw shaft 241, and hence the vertically movable arms 243 vertically move in unison with the collar 242.

The joint arms 2111, 2112 (see FIG. 3) have respective front ends connected to the vertically movable arms 243, respectively, by a pin 2422. Therefore, vertical movement of the collar 242 along the screw shaft 241 is smoothly transmitted through the vertically movable arms 243 and the joint arms 2111, 2112 to the pitching frame 211, vertically moving the front end portion of the riding unit 21 while allowing the wheels 2113, 2114 on the rear portion of the pitching frame 211 to roll back and forth on the base frame 50.

The screw shaft 241 has a lower end joined through a coupling (not shown) to the shaft of a potentiometer 248, so that the shaft of the potentiometer 248 can be rotated about by the screw shaft 241. The potentiometer 248 outputs a voltage whose level depends on the angular displacement of the screw shaft 241, to the controller 30. The controller 30 controls the direction in which the stepping motor 244 rotates and the speed at which the stepping motor 244 rotates for vertically swinging the riding unit 21, in relation to the voltage outputted by the potentiometer 248 and simulated images displayed on the display unit 10.

Sensors (not shown) for detecting the position of the collar 242 on the screw shaft 241 are disposed in respective positions which face upper and lower ends of the screw shaft 241. When the collar 242 reaches either one of those positions of the sensors, the controller 30 de-energizes the stepping motor 244 in response to a detected signal from the corresponding sensor.

The floor arrester 113 (see FIG. 2) is mounted on the base frame 50 and projects upwardly through the space surrounded by the front trapezoidal member D of the pitching frame 211. When the riding game machine 1 stops operating, the stepping motor 244 is energized to lower the collar 242 to a lowermost position on the screw shaft 241, placing the rubber sheet 91 of the yawing plate 213 against the floor arrester 113 for thereby preventing the riding unit 21 from accidental movement.

A rubber sheet 1131 is attached to an upper surface of the floor arrester 113 for contact with the rubber sheet 91 of the yawing plate 213. Therefore, undue shocks produced the rubber sheet 91 is brought into contact with the rubber sheet 1131 are absorbed. A sensor (not shown) is disposed in a position corresponding to the upper end of the floor arrester 113. When the collar 242 reaches the position of the sensor, it outputs a detected signal to the controller 30, which then de-energizes the stepping motor 244.

Figure 10:
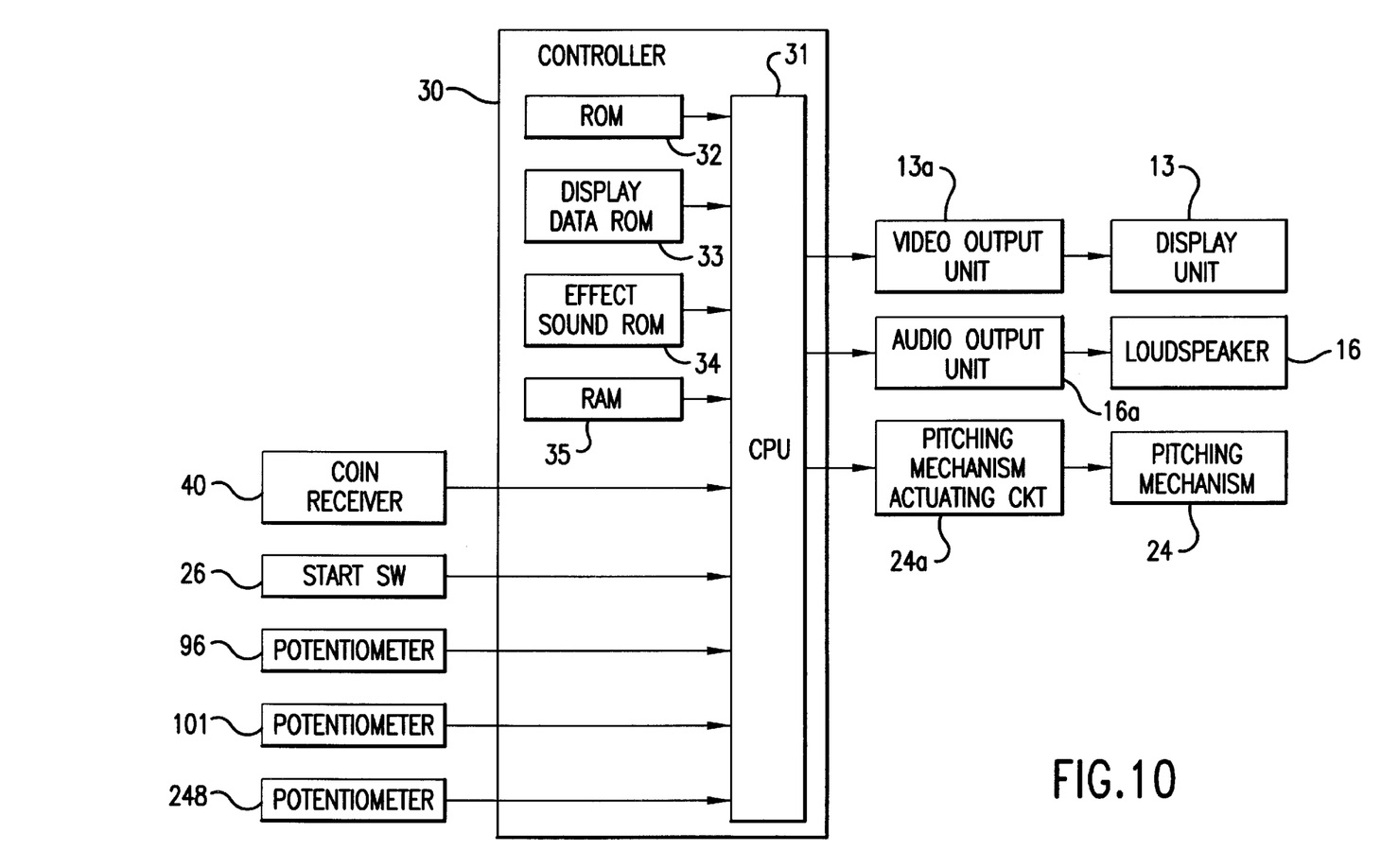
FIG. 10 is a block diagram of an electronic control system of the riding game machine shown in FIG. 1.

As shown in FIG. 10, the controller 30 comprises a central processing unit (CPU) 31 for carrying various processing operations, a program read-only memory (ROM) 32 which stores game programs, a display data ROM 33 which stores data of simulated images to be displayed on the display unit 10, an effect sound data ROM 34 which stores effect sounds including engine sounds, wave sounds, etc., and a random-access memory (RAM) 35 for temporarily storing processed data. The controller 30 serves to control changes in simulated images and operation of the pitching mechanism 24 in relation to each other.

The coin receiver 40, the start switch 26, and the potentiometers 96, 101, 248 are electrically connected to the CPU 31. When signals from the coin receiver 40, the start switch 26, and the potentiometers 96, 101, 248 are supplied to the CPU 31, the CPU 31 controls the video projector 13 through a video output unit 13a, the loudspeaker 16 through an audio output unit 16a, and the pitching mechanism 24 through a pitching mechanism actuating circuit 24a. The CPU 31 controls operation of the pitching mechanism 24 in relation to changes in simulated images such as of sea waves, etc.

Operation of the riding game machine 1 will be described below.

The riding game machine 1 can play the game of a jet ski race on a wavy sea, for example. When the player of the riding game machine 1 rides on the riding unit 21 and inserts a coin into the coin receiver 40, the controller 30 actuates the pitching mechanism 24 to move the collar 242 from the lowermost position to a substantially vertically intermediate position on the screw shaft 241, lifting the riding unit 21 off the floor arrester 113 in readiness for starting the game.

The controller 30 operates the video projector 13 to display a demonstration image on the screen 12 of the display unit 10. At this time, the video projector 13 also displays a game mode selection image for the player to select one of game modes. The controller 30 operates the loudspeaker 16 to output an effect sound such as of background music. When the player presses the start switch 26 a preset number of times to select a desired game mode, the controller 30 sends image data to the video projector 13 to display a game image corresponding to the selected game mode, e.g., an image of a jet ski operated by the player and a jet ski operated by a competitor, which are lined up at a start line on sea, and obstacles such as yachts or the like. Then, the player turns on the start switch 26 to start the game.

The player holds the grips 221, 222 of the bar handle 22, and pulls the accelerator lever 231 toward the grip 221 with the thumb of his right hand. The potentiometer 101 outputs a voltage depending on the angular displacement of the accelerator lever 231. Depending on the voltage supplied from the potentiometer 101, the controller 30 accelerates the jet ski displayed on the display unit 10 and produces, from the loudspeaker 16, an engine sound commensurate with the acceleration and an impact sound of a wave hit by the jet ski. When the jet ski hits a wave, the controller 30 displays a splash on the screen 12 depending on the size of the wave. The splash is displayed when the positional data of the jet ski and the wave on the screen 12 coincide with each other. The player operates the displayed jet ski while avoiding displayed obstacles such as yachts, with the bar handle 22 and the accelerator lever 231, and tries to reach a goal faster than the competitor whose displayed jet ski is operated according to the game program by the controller 30. When the jet ski hits an obstacle such as yacht, the loudspeaker 16 outputs a large impact sound, and the game is finished or re-started from the position where the jet ski hit the obstacle.

When the front end of the jet ski operated by the player reaches the peak of an upcoming wave which is displayed on the display unit 10, the front end of the riding device 20 is lifted. When the front end of the jet ski operated by the player enters the valley between waves displayed on the display unit 10, the front end of the riding device 20 is lowered. Specifically, when the front end of the jet ski reaches the peak of an upcoming wave, the stepping motor 244 is rotated in one direction to rotate the screw shaft 241 to move the collar 242 upwardly, thereby lifting the front end of the riding device 20. When the front end of the jet ski enters the valley between waves, the stepping motor 244 is rotated in the opposite direction to rotate the screw shaft 241 to move the collar 242 downwardly, thereby lowering the front end of the riding device 20.

Such vertical pitching movements of the riding device 20 are realized by actuating the pitching mechanism 24 using data stored in the ROM 32 with respect to the period and peak height of waves displayed in simulated images. Specifically, when the speed of the jet ski is higher, the period of waves is shorter, and the speed of the jet ski is lower, the period of waves is longer. Depending on the period of waves, the period of rotations in one direction and other is varied, and so is the period of pitching movements. Depending on the peak height of waves, the angular displacement and speed of the stepping motor 244 are adjusted. Specifically, when the height of a wave (the depth of a valley) is larger, the angular displacement and/or speed of the stepping motor 244 is larger, and when the height of a wave (the depth of a valley) is smaller, the angular displacement and/or speed of the stepping motor 244 is smaller.

The angular displacement of the stepping motor 244 is detected by the potentiometer 248 connected to the lower end of the screw shaft 241. The stepping motor 244 is de-energized based on a voltage which is outputted from the potentiometer 248 when the detected angular displacement reaches a predetermined value.

When the player angularly moves the bar handle 22 to the right or left during operation, the potentiometer 96 outputs a voltage depending on the direction in and the angle through which the bar handle 22 is angularly moved. Based on the voltage outputted from the potentiometer 96, the controller 30 changes the direction of travel of the jet ski displayed on the display unit 10. At this time, the jet ski is displayed obliquely tilted on the display unit 10 depending on the direction in and the angle through which the bar handle 22 is angularly moved. Viewing the tilted state of the displayed jet ski, the player tilts his own body in the direction in which the displayed jet ski is tilted, based on his experience of riding on bicycles, motorcycles, etc. As a result, the weight of the player rests more heavily on one side of the rolling plate 212 depending on the angle through which the jet sky is tilted. Therefore, the rolling plate 212 is also tilted laterally depending on the angle through which the jet sky is tilted.

When the rolling plate 212 is thus tilted laterally, the center of gravity of the yawing plate 213 moves depending on the direction in and the angle through which the rolling plate 212 is tilted, causing the front portion of the yawing plate 213 to swing over the rolling plate 212. As a result, the orientation of the body of the player moves in the direction in which the bar handle 22 is angularly moved. While playing the game, therefore, the player feels realistic as if he is actually operating the jet ski.

In the illustrated embodiment, the riding game machine 1 can play the game of a jet ski race on a wavy sea, for example. However, the riding game machine 1 may play a time trial game in which the player alone operates a jet ski to reach a goal as fast as possible, or may play the games of various more complex jet ski races. A plurality of riding game machines 1 may be connected together through communication lines for allowing a plurality of players to compete in a jet ski game while viewing respective simulated images that are centered around their own jet skis. The controller 30 can display more realistic simulated images on the display unit 10 if the simulated images are displayed based on three-dimensional image data processed by polygon mapping or the like.

In the illustrated riding game machine 1, a displayed jet ski is operated on a wavy sea. However, the riding game machine 1 can play various other games if floor bases resembling various other vehicles are installed on the yawing plate 213. For example, a hooded floor base resembling a motorcycle may be installed on the yawing plate 213 to play the game of a moto cross race. In the game of a moto cross race, the pitching mechanism 24 may be actuated depending on the contour of rough terrain displayed on the screen 12. As with a jet ski, the rolling plate 212 and the yawing plate 213 are moved when the player's body is tilted as the player angularly moves the bar handle 22.

The pitching mechanism 24 may be positioned behind the riding unit 21 rather than in front of the riding unit 21. If the pitching mechanism 24 is positioned behind the riding unit 21, then the riding unit 21 may be vertically swung by rotating the stepping motor 244 in directions opposite to the directions in which it is rotated in the case where the pitching mechanism 24 is positioned in front of the riding unit 21.

In the illustrated embodiment, the rolling plate 212 and the yawing plate 213 are moved when the player's body is tilted. However, the rolling plate 212 and the yawing plate 213 may be operated by respective actuating mechanisms comprising ball screws or the like. Such actuating mechanisms for operating the rolling plate 212 and the yawing plate 213 allow the riding unit 21 to be positively tilted in complex patterns when the display jet ski is subject to lateral waves or winds.

While the swinging means for swinging the riding unit 21 comprises the pitching member, the rolling member, and the yawing member in the illustrated embodiment, the swinging means may comprise only the pitching member and the rolling member. The swinging means thus modified is sufficient enough to permit the player to feel realistic in playing a game on the riding game machine 1.

Although a certain preferred embodiment of the present invention has been shown and described in detail, it should be understood that various changes and modifications may be made therein without departing from the scope of the appended claims.

What is claimed is:

1. A riding game machine comprising:
 a display unit for displaying a simulated image of an object on a wavy surface; and
 a riding device swingable depending on the simulated image displayed by said display unit;
 said riding device comprising:
  a riding unit for a player to ride thereon;
  a handle coupled to said riding unit for changing a direction of travel of the object of the simulated image displayed by said display unit;
  an accelerator lever mounted on said handle for changing a speed of the object of the simulated image displayed by said display unit;
  swinging means for swinging said riding unit, said swinging means having a pitching member for swinging said riding unit about a horizontal transverse axis and a rolling member for swinging said riding unit about a horizontal longitudinal axis; and pitching means for actuating said pitching member in relation to travel of the object on the wavy surface in the simulated image displayed by said display unit.

2. A riding game machine according to claim 1, wherein said pitching means comprises:

a vertical drive shaft;

actuating means for rotating said vertical drive shaft about its own axis; and a movable member threaded over said vertical drive shaft for movement along said vertical drive shaft in response to rotation of the vertical drive shaft by said actuating means;

said movable member being coupled to said pitching member.

3. A riding game machine according to claim 1 or 2, wherein said pitching member comprises a pitching frame having a front end coupled to said movable member and movable about said horizontal lateral axis in response to movement of the movable member along said vertical drive shaft, and wherein said rolling member comprises a rolling plate, said pitching frame having an inner space defined therein, said rolling plate being disposed in alignment with said inner space and angularly movable about a shaft mounted on said pitching frame in alignment with said horizontal longitudinal axis.

4. A riding game machine according to claim 1 or 2, wherein said swinging means further comprises a yawing member for swinging said riding unit about a vertical axis.

5. A riding game machine according to claim 4, wherein said pitching member comprises a pitching frame having a front end coupled to said movable member and movable about said horizontal lateral axis in response to movement of the movable member along said vertical drive shaft, wherein said rolling member comprises a rolling plate, said pitching frame having an inner space defined therein, said rolling plate being disposed in alignment with said inner space and angularly movable about a shaft mounted on said pitching frame in alignment with said horizontal longitudinal axis, and wherein said yawing member comprises a yawing plate disposed on said rolling plate and having a front portion angularly movable about a shaft disposed on a rear portion thereof in alignment with said vertical axis.

6. A riding game machine comprising:

a riding unit for a player to ride thereon, said riding unit being swingable about at least a horizontal lateral axis and a horizontal longitudinal axis thereof;

a pitching member coupled to said riding unit for swinging said riding unit about said horizontal transverse axis;

a rolling member coupled to said riding unit for allowing said riding unit to swing about said horizontal longitudinal axis depending on movement of the player on said riding unit;

a display unit for displaying a simulated image of an object on a wavy surface;

a handle coupled to said riding unit and operable by the player for changing a direction of travel of the object of the simulated image displayed by said display unit;

an accelerator lever mounted on said handle and operable by the player for changing a speed of the object of the simulated image displayed by said display unit;

pitching means for actuating said pitching member; and control means for controlling said pitching means depending on the direction and speed of the object on the wavy surface in the simulated image displayed by said display unit.

7. A riding game machine according to claim 6, wherein said pitching means comprises:

a vertical drive shaft;

actuating means for rotating said vertical drive shaft about its own axis; and a movable member threaded over said vertical drive shaft for movement along said vertical drive shaft in response to rotation of the vertical drive shaft by said actuating means;

said movable member being coupled to said pitching member.

8. A riding game machine according to claim 6, wherein said pitching member comprises a pitching frame having a front end coupled to said movable member and movable about said horizontal lateral axis in response to movement of the movable member along said vertical drive shaft, and wherein said rolling member comprises a rolling plate, said pitching frame having an inner space defined therein, said rolling plate being disposed in alignment with said inner space and angularly movable about a shaft mounted on said pitching frame in alignment with said horizontal longitudinal axis.

9. A riding game machine according to claim 6, wherein said swinging means further comprises a yawing member for allowing said riding unit to swing about a vertical axis depending on movement of the player on said riding unit.

10. A riding game machine according to claim 9, wherein said pitching member comprises a pitching frame having a front end coupled to said movable member and movable about said horizontal lateral axis in response to movement of the movable member along said vertical drive shaft, wherein said rolling member comprises a rolling plate, said pitching frame having an inner space defined therein, said rolling plate being disposed in alignment with said inner space and angularly movable about a shaft mounted on said pitching frame in alignment with said horizontal longitudinal axis, and wherein said yawing member comprises a yawing plate disposed on said rolling plate and having a front portion angularly movable about a shaft disposed on a rear portion thereof in alignment with said vertical axis.

* * * * *